Sept. 1, 1931.  T. F. BAILY ET AL  1,821,783
PROCESS OF MAKING SYNTHETIC PIG IRON
Filed Jan. 28, 1928
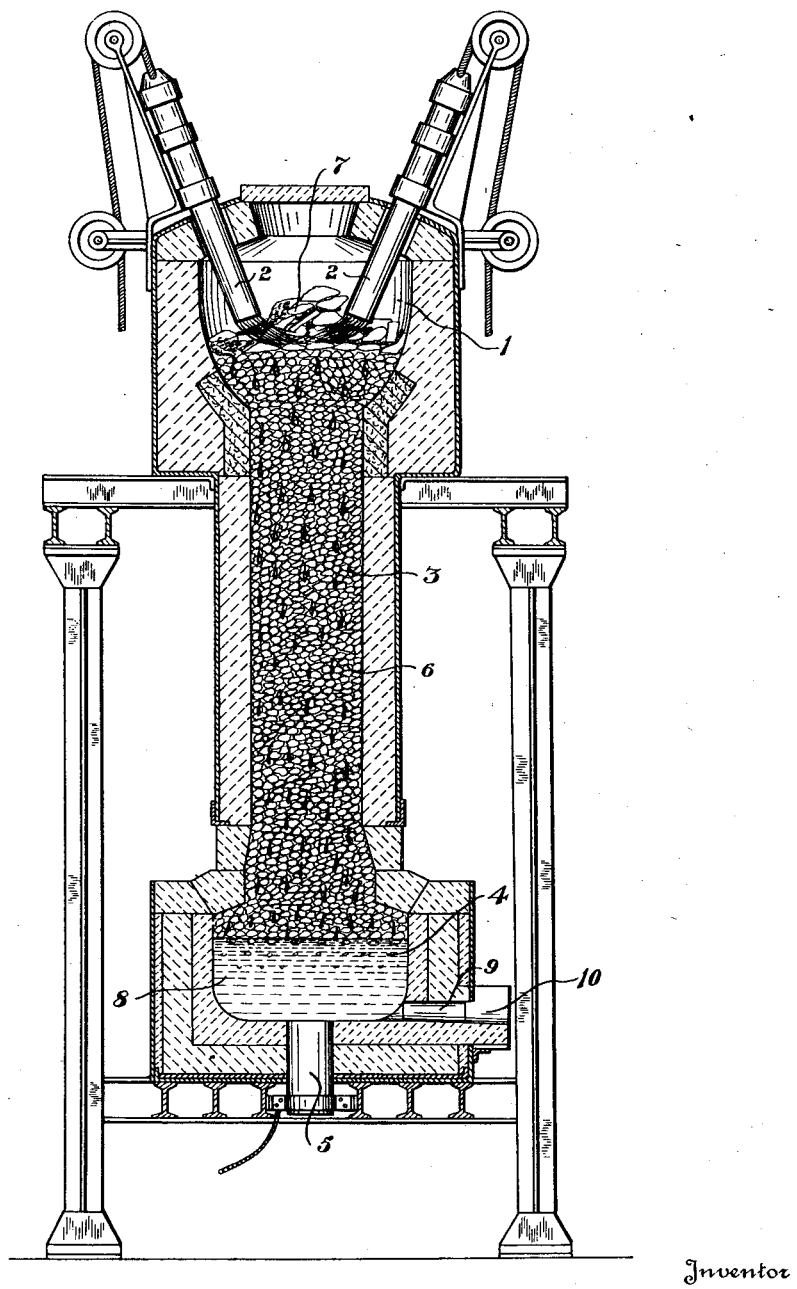
Inventor
T. F. Baily
L. G. Pritz
By Frease and Bond
Attorneys Patented Sept. 1, 1931

1,821,783

UNITED STATES PATENT OFFICE

THADDEUS F. BAILY, OF ALLIANCE, AND LAWRENCE G. PRITZ, OF CANTON, OHIO; SAID PRITZ ASSIGNOR TO SAID BAILY

PROCESS OF MAKING SYNTHETIC PIG IRON

Application filed January 28, 1928. Serial No. 250,222.

This process relates to the production of synthetic pig iron containing silicon and manganese from steel scrap and open hearth slag and the like.

In the usual practice of producing synthetic pig iron, from scrap, sand, manganese ore, and if phosphorus is required, phosphate rock are introduced in the top of the furnace and melted and passed down through the resistance portion of the furnace as described in the pending application of Thaddeus F. Baily, Pat. No. 1,675,744 of July 3, 1928, where the molten iron absorbs carbon and where silicon, manganese and phosphorus, if used, are reduced from their oxides and pass into the metal, forming the desired content of these constituents in the pig iron.

Since both acid and Bessemer slag contain silica, one of the essential constituents for silicon, and basic open hearth slag contains both phosphorus as well as manganese, and since these oxides are in the thoroughly agglomerated condition, they melt at a lower temperature and with less volatilization loss than where sand, manganese ore and phosphate rock are melted in their primary form as individual components, even though charged and mixed together.

Further, it is possible by suitable mixtures of acid and basic slags to obtain the desired content of manganese and silicon. In practice, in order to obtain the desired alloy materials in the pig iron, such as manganese, slag or slags containing sufficient manganese to produce the desired amount of manganese in the metal are charged into the furnace, and since manganese is more readily reduced than silica, substantially all the manganese in the slag is recovered and goes into the metal.

As regards silica, it being a more difficult oxide to reduce than manganese, by the proper blending of the slags or the addition of sand, and by the control of temperature in the reduction zone, all of the manganese may be recovered and such quantity of the silica reduced as to produce the desired silicon content in the metal, the balance of the silica passing off as slag, usually in combination with the proper amount of calcium oxide.

It is well known that open hearth slag has been used in blast furnaces in which certain parts of the constituents of the slag are recovered and go into the iron produced by the furnace. However, it is pointed out that in the blast furnace air is admitted at the tuyères while in the present process there is no air admitted to the furnace at any point.

This air admitted at the tuyères in the blast furnace naturally causes an oxidizing condition in the furnace at that point which is near the bottom of the furnace and adjacent to the pool of molten metal, causing an oxidizing influence at this point.

It should also be remembered that in the blast furnace the silicon from the slag is reduced very close to this point while in the present case the reduction of the silicon takes place in the upper end of the furnace and under a reducing condition.

The advantage of reducing the silicon in the upper part of the furnace is that it gives a quicker intermingling of the reduced silicon with the iron and a better opportunity for the separation of the slag and metal produced, as all the metallic constituents are completely reduced long before they reach the pool of metal and it is found that iron produced in this way is much more free from slag and non-metallic inclusions, producing an iron of higher quality.

In the drawing, the figure is a vertical sectional view through a furnace in which the process may be carried out.

Similar numerals refer to similar parts throughout the drawing.

Although the process may be carried out in various types of furnaces, a preferred form of furnace for this purpose is illustrated, which comprises generally the upper melting chamber 1 provided with movable electrodes 2, the shaft portion 3 communicating with the melting chamber and the crucible 4 in the lower end of the shaft, an electrode 5 extending into the bottom of the crucible.

The interior of the furnace may be substantially filled with an electrical resistance material such as the coke indicated at 6 whereby resistance may be maintained through said material between the upper and lower electrodes 2 and 5 respectively.

In carrying out the process, the desired slag may be mixed with the scrap steel in the proper proportion as indicated at 7, and melted down in the melting chamber of the furnace, the molten material trickling down through the coke and collecting in the crucible as shown at 8.

From time to time, the molten metal may be withdrawn from the crucible by removing the plug 9 from the pouring spout 10.

If desired, the proper amount of the desired slag may be first melted in the melting chamber, after which the proper amount of scrap steel is melted therein and permitted to trickle down through the coke and collect and mix with the molten constituents reduced from the slag in the crucible.

It will be seen that either basic or acid slags or a mixture of the two may be introduced in the proper proportions to produce the desired content of manganese, silicon and the like in the metal produced by the process.

It will be seen that the reduced constituents of the slag are melted and reduced in the upper portion of the furnace, quickly intermingling with the iron, the entire process being carried out under a reducing condition.

In the case of using raw material containing sulphur which it is desired to reduce, a basic slag containing CaO is charged into the furnace, the metallic oxide reduced and recovered in the metal, and the CaO in proper combination with other slag forming material forms a desulphurizing slag for the elimination of sulphur.

We claim:

1. That process in the manufacture of synthetic pig iron from scrap steel, which consists in melting a charge of steel scrap with a mixture of acid and basic slag in such proportions as to produce from the slag the desired contents of manganese and phosphorus, reducing all of the manganese and phosphorus, producing the desired quantities of these two elements in the pig iron and reducing such portion of the silica as to also produce the desired silicon in the metal, additions of silica or lime as required being made to maintain the residual slag in a mormal fluid condition at a mormal operating temperature for the furnace.

2. That process in the manufacture of synthetic pig iron from scrap steel, which includes mixing a charge of steel scrap with acid and basic slag in such proportions as to produce from the slag the desired contents of manganese and phosphorus, melting the mixture at the top of an electrically resistance heated bed of coke, passing the molten charge downward through the coke reducing all of the manganese and phosphorus to produce the desired quantities of these two elements in the pig iron, partially reducing the silica in the slag to produce the desired quantity of silicon in the pig iron, and collecting the pig iron in molten condition at the bottom of the bed of coke, the heat for reduction being supplied by electric resistance in the bed of coke.

In testimony that we claim the above, we have hereunto subscribed our names.

THADDEUS F. BAILY.
LAWRENCE G. PRITZ.